United States Patent
Chen et al.

(10) Patent No.: US 7,271,561 B2
(45) Date of Patent: Sep. 18, 2007

(54) FAN MODULE AND CONTROL DEVICE THEREOF

(75) Inventors: Chien Hua Chen, Taoyuan Hsien (TW); Chun-Lung Chiu, Taoyuan Hsien (TW); Wen-Chuan Ma, Taoyuan Hsien (TW); Wen-Shi Huang, Taoyuan Hsien (TW)

(73) Assignee: Delta Electronic, Inc., Taoyuan Hsien (TW)

( * ) Notice: Subject to any disclaimer, the term of this patent is extended or adjusted under 35 U.S.C. 154(b) by 0 days.

(21) Appl. No.: 11/391,550

(22) Filed: Mar. 29, 2006

(65) Prior Publication Data

US 2006/0232231 A1 Oct. 19, 2006

(30) Foreign Application Priority Data

Apr. 18, 2005 (TW) .................. 94112192 A

(51) Int. Cl.
*G05D 23/24* (2006.01)

(52) U.S. Cl. .................. 318/473; 318/68; 388/934

(58) Field of Classification Search .................. 318/34, 318/68, 268, 471–473; 388/934
See application file for complete search history.

(56) References Cited

U.S. PATENT DOCUMENTS

| | | | | |
|---|---|---|---|---|
| 3,799,245 A | * | 3/1974 | Ferdelman | 165/265 |
| 4,506,199 A | * | 3/1985 | Asche | 388/816 |
| 4,552,205 A | * | 11/1985 | Saunders | 165/236 |
| 4,988,930 A | * | 1/1991 | Oberheide | 318/82 |
| 5,049,801 A | * | 9/1991 | Potter | 318/785 |
| 5,990,582 A | * | 11/1999 | Henderson et al. | 307/139 |
| 6,368,064 B1 | * | 4/2002 | Bendikas et al. | 417/2 |
| 6,396,231 B1 | * | 5/2002 | Horng et al. | 318/471 |
| 6,932,696 B2 | * | 8/2005 | Schwartz et al. | 454/184 |
| 6,950,969 B2 | * | 9/2005 | Thompson et al. | 714/44 |
| 7,141,950 B1 | * | 11/2006 | Verge | 318/599 |

* cited by examiner

*Primary Examiner*—Bentsu Ro
(74) *Attorney, Agent, or Firm*—Birch, Stewart, Kolasch & Birch, LLP

(57) ABSTRACT

Fan module and control device thereof. The fan module comprises a plurality of fans and the control device. The control device comprises a temperature sensing circuit, and a driving circuit. The temperature sensing circuit detects an ambient temperature of the fans and generates a sensing signal accordingly. The driving circuit is coupled between the fans and temperature sensing circuit, and comprises a fully powered operating mode and a power-saving operating mode, wherein the driving circuit selects different operating modes in accordance with the sensing signal, and generates a fan driving signal controlling the speed of the fans.

18 Claims, 5 Drawing Sheets

FAN MODULE AND CONTROL DEVICE THEREOF

BACKGROUND

The invention relates to a fan module, and more specifically to a control device providing fan speed modulation according to the number of loads, and a fan module with the control device.

With improvements in technology, the number of electronic components inside electronic devices has increased, and the generated heat during operation is also increased corresponding to the number of electronic components. To maintain performance, fans are conventionally used to dissipate heat therefrom. However, because the size of the housings of the electronic devices and the number of components therein are different, and heat generated in middle-sized and big-sized electronic devices is high, at least two fans are often used so as to achieve the effect of heat dissipation. Conventionally, a fan module comprises an integrated plurality of fans in a frame and is controlled by a control device.

Electronic devices with differing load numbers require fan modules having different powers. Conventional fan modules utilize fully powered and power-saving operating modes. Electronic devices with fewer loads require only the former mode while those with more loads require both modes. As shown in FIG. 1, an electronic device 1 includes a fully powered fan module 2, a power-saving fan module 3, and a plurality of hot-plug loads 4. With fewer loads 4, the power-saving fan module 3 can dissipate heat. With increased loads 4, the fully powered fan module 2 will start for heat dissipation.

Further, with temperature detection components built into fan modules 2 and 3, control devices therein generate a control signal corresponding detected temperature variations and transmit the control signal to a plurality of fans. FIGS. 2A and 2B show relationships between temperature and speed with respect to the fan modules 2 and 3. As shown in FIG. 2A, the relationship between the speed and temperature is linear, that is, with increased temperature (t1 to t2), the speed of the fans is increased accordingly (r1 to r2). However, in practice, the relationship between the temperature and speed may not be as direct. With the impact of noise, the line may become a curve, thereby degrading the performance of the control devices. Moreover, as shown in FIG. 2B, when the temperature exceeds the threshold temperature t3, the speed of the fans is increased to speed r2 from speed r1. However, such rapid speed changes can reduce the life of electronic devices with more loads.

With concentration of components inside electronic devices and reduced size thereof, the amount of heat generated thereof increases. Thus, it is necessary to obtain a fan module with better heat dissipation performance and a control method thereof is called for.

SUMMARY

The invention is directed to a control device having several operating modes and a fan module including the control device for electronic devices having differing numbers of loads.

A fan module and a control device thereof are provided. An exemplary embodiment of a fan module according to the present invention includes a plurality of fans and a control device. The control device includes a temperature sensing circuit and a driving circuit. The temperature sensing circuit detects an ambient temperature of the fans and generates a sensing signal to the driving circuit. The driving circuit is coupled between the fans and the temperature sensing circuit, and can drive the fans in a fully powered operating mode or a power-saving operating mode. The driving circuit can selects different operating modes in accordance with the sensing signal from the temperature sensing circuit to control the speed of the fans. The driving circuit drives the fans in the power-saving operating mode when the number of loads in the electronic device is stable, and drives the fans in the fully powered operating mode when the number of loads in the electronic device is unstable.

The control device further includes a switch coupled to the driving circuit in order to control the driving circuit in the fully powered or the power-saving operating modes. The switch provides manual control of operating modes of the driving circuit.

Moreover, the control device further includes an address setting device coupled between the driving circuit and the fans, enabling the driving circuit to directly retrieve the operating condition of each fan. The number and position of malfunctioning fans can also be obtained.

DESCRIPTION OF THE DRAWINGS

The invention will be described by way of exemplary embodiments, but not limitations, illustrated in the accompanying drawings in which like references denote similar elements, and in which.

DETAILED DESCRIPTION

Figure 1:
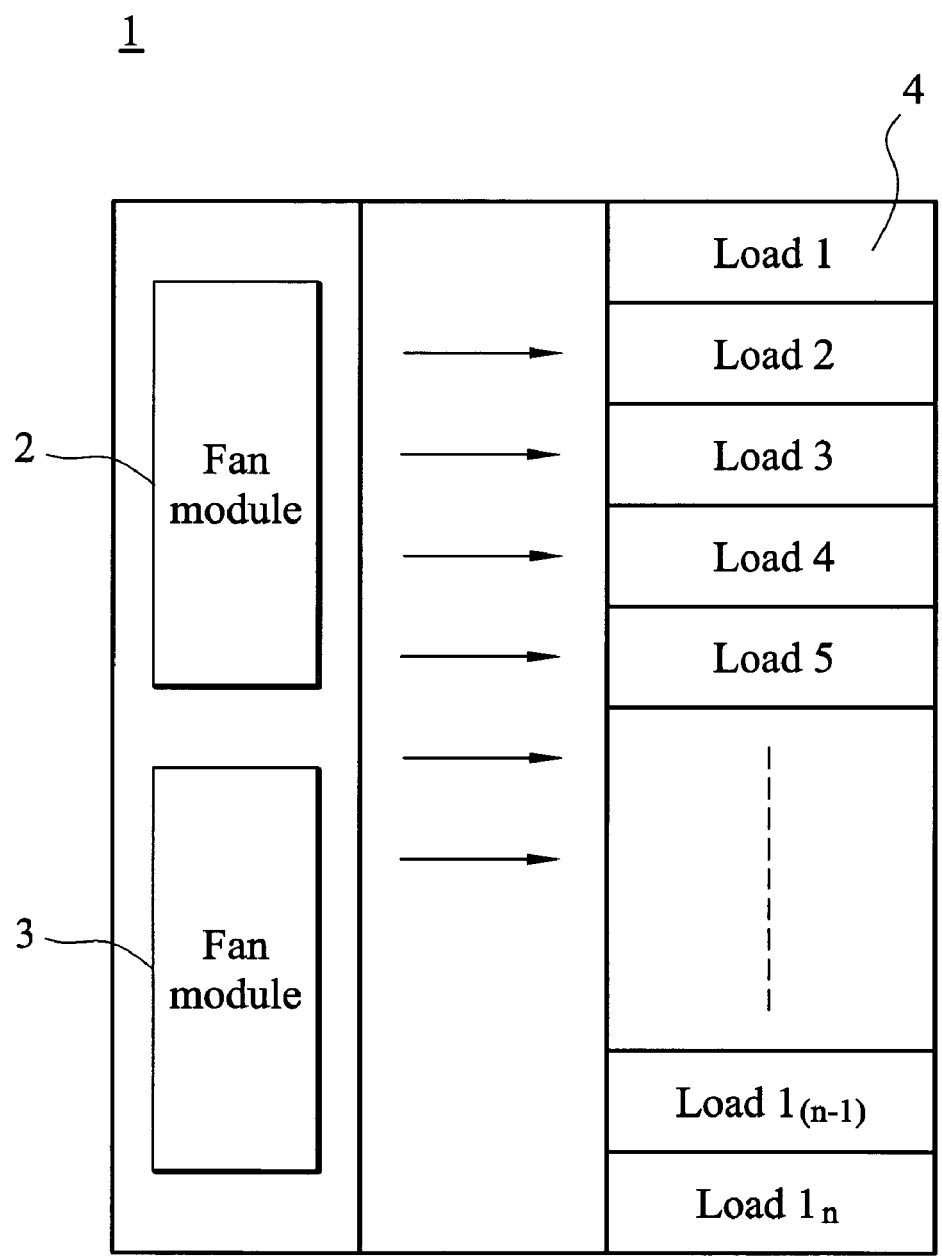
FIG. 1 is a schematic diagram of a conventional electronic device having two different fan modules and a plurality of loads.
Figure 2A:
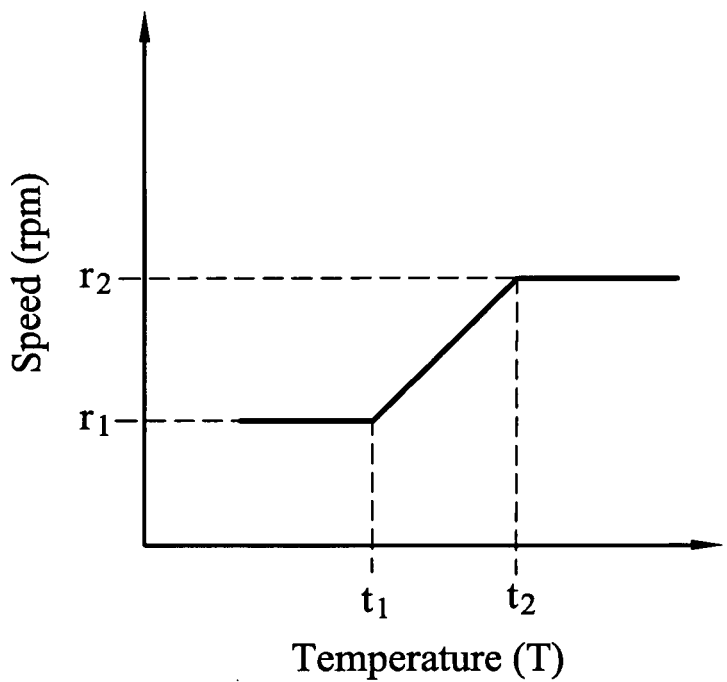
FIG. 2A shows a fan speed to ambient temperature characteristic curve of a conventional fan module.
Figure 2B:
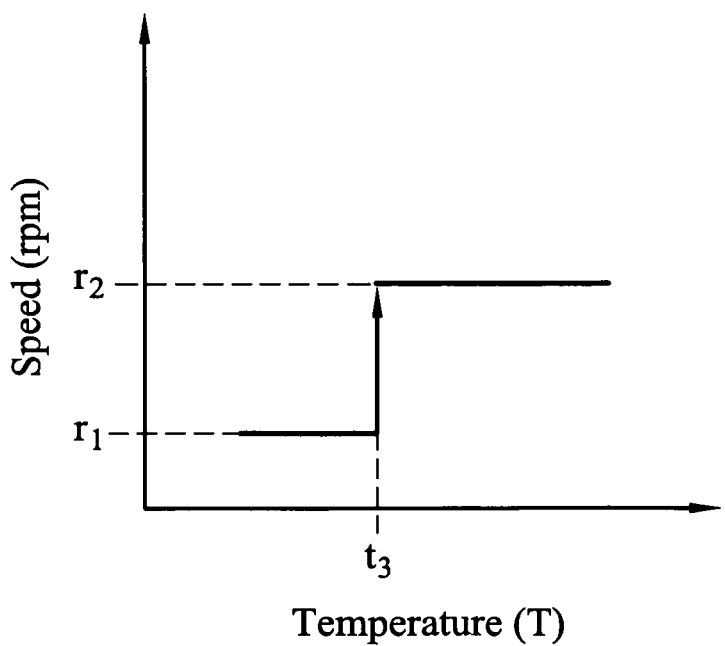
FIG. 2B shows a fan speed to ambient temperature characteristic curve of another conventional fan module.
Figure 3:
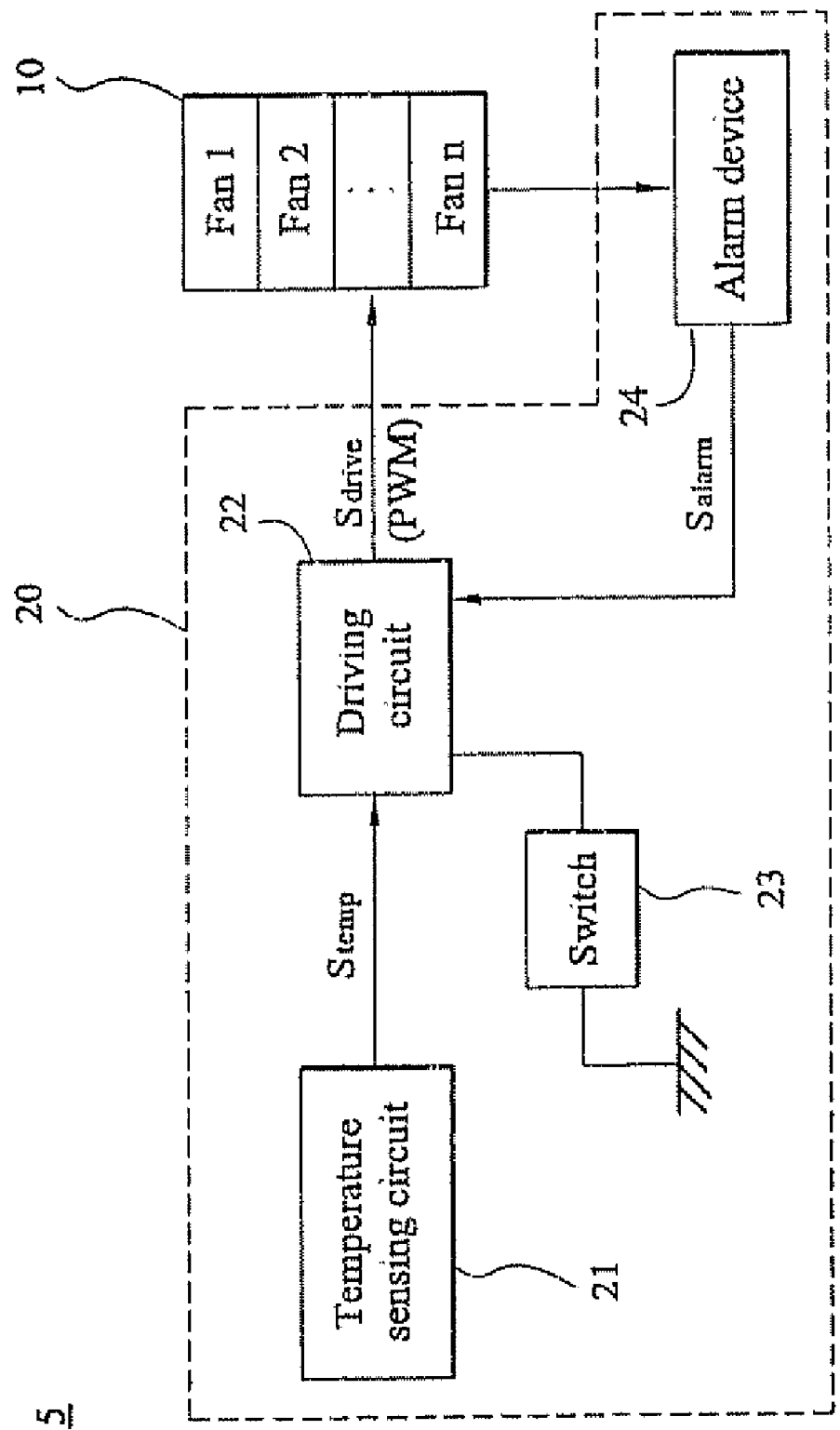
FIG. 3 is a schematic diagram of an embodiment of a fan module of the invention.

As shown in FIG. 3, a fan module 5 according to one embodiment of the invention comprises a plurality of fans 10 and a control device 20. The control device 20 is coupled to the fans 10 and controls the fans at different ambient temperatures.

The fans can be integrated in a frame (not shown), and a signal line and a power line of each fan 10 are coupled to the control device 20.

The control device 20 includes a temperature sensing circuit 21, a driving circuit 22, and a switch 23.

The temperature sensing circuit 21 includes at least a thermal sensor (not shown), for example, a thermistor. The temperature sensing circuit 21 detects the ambient temperature of the fans 10 and generates a sensing signal $S_{temp}$ according to the detected ambient temperature.

The driving circuit 22 is coupled between the fans 10 and the temperature sensing circuit 21, and includes at least a driving processor (not shown). A driver program for fully powered and power-saving operating modes is stored in the driving processor. The driving processor selects fully powered or power-saving operating modes in accordance with the sensing signal $S_{temp}$ transmitted from the temperature sensing circuit 21, and then generates a fan driving signal $S_{drive}$ to control the fans in different operating modes. The fan driving signal $S_{drive}$ is a Pulse Width Modulation (PWM) signal.

The switch 23, preferably can be manually operated, is coupled to the driving circuit 22. The driving circuit 22 receives a high level signal when the switch 23 is open and a low level signal when the switch 23 is closed. In the embodiment, the driving circuit 22 receives a high level signal to operate the fans in fully powered operating mode, and receives a low level signal to operate the fans in power-saving operating mode.

In the embodiment, the control device 20 further includes an alarm device 24 coupled between the fans 10 and driving circuit 22. The alarm device 24 transmits an alarm signal $S_{alarm}$ to the driving circuit 22 in response to failure of the fans 10, thereby allowing the driving circuit 22 to modulate the fan driving signal $S_{drive}$ according to the alarm signal $S_{alarm}$. For example, if there are ten fans 10 in the fan module and two of the fans 10 are failed, the driving circuit 22 will control the other eight fans 10 in the fully powered operating mode and increases speed thereof, thereby compensating heat-removal degradation stemming from the two malfunctioned fans 10.

Figure 4:
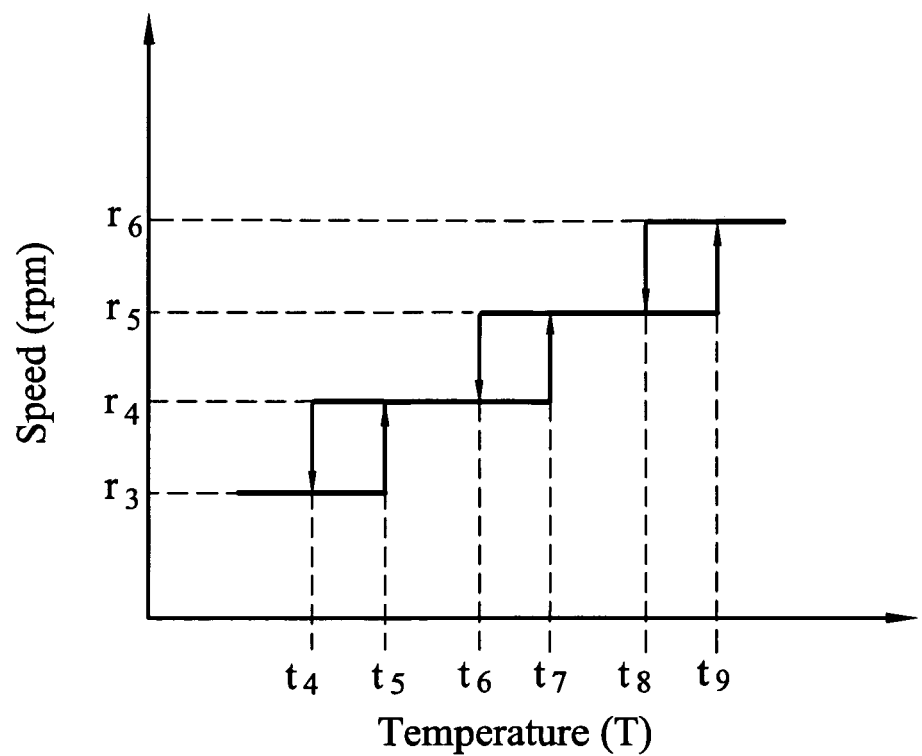
FIG. 4 shows a fan speed to ambient temperature characteristic curve of an embodiment of a fan module in a power-saving operating mode.

With reference to FIG. 4, when the driving circuit 22 is operated in the fully powered operating mode, the driving processor controls the speed of fans 10 in accordance with the sensing signal $S_{temp}$. As shown in FIG. 4, when the ambient temperature of the fans 10 is lower than temperature t4, the driving circuit 22 controls the fans 10 at speed r3, and increases the speed of the fans 10 to speed r4 when the ambient temperature increases to temperature t5. If the ambient temperature continues to increase to temperature t7, the speed of the fans will be increased to speed r5, and if the ambient temperature decreases to temperature t4 due to the acceleration of the fans 10, the speed of the fans 10 will be decreased to speed r3. Further, if the ambient temperature does not decrease due to the acceleration of the fans 10, the speed of the fans will be increased to speeds r5 and r6 when the ambient temperature exceeds temperatures t7 and t9, respectively. If the ambient temperature decreases to temperatures t6 and t8, the speed of fans 10 will be decreased to speeds r4 and r5 respectively. It is obvious that there are several nodes set in the temperature to speed characteristic curve, thus the speed of the fans 10 can be varied according to corresponding node. Control device 20 controls the speed of the fans 10 better, especially when applied in electronic devices whose number of hot-swap loads changes frequently.

Figure 5:
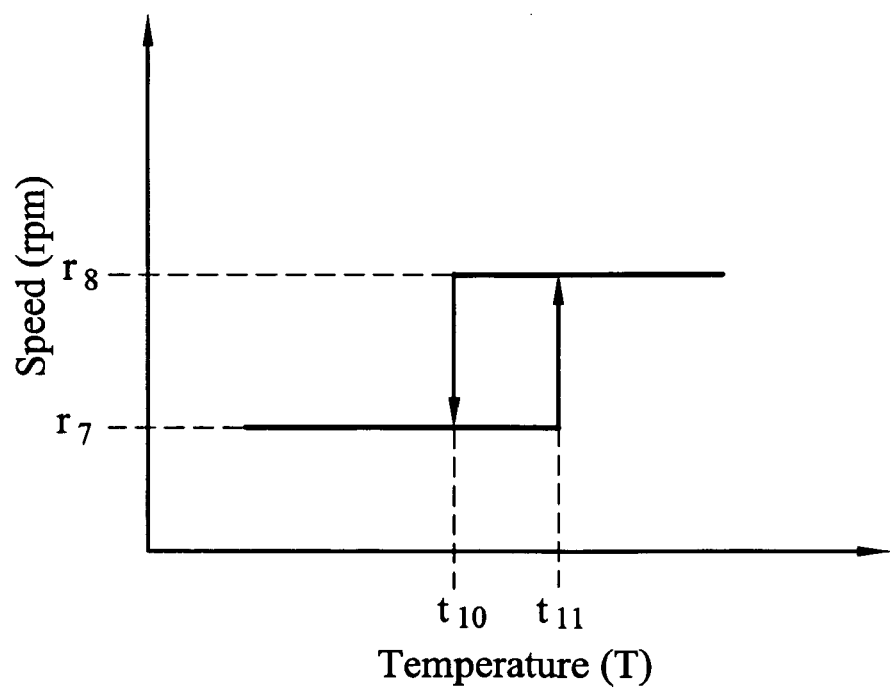
FIG. 5 shows a fan speed to ambient temperature characteristic curve of another embodiment of a fan module in a fully powered operating mode.

With reference to FIG. 5, when the driving circuit 22 is operated in the power-saving operating mode, the driving processor controls the speed of fans 10 in accordance with the sensing signal $S_{temp}$. When the ambient temperature of the fans 10 exceeds temperature t11, the speed of the fans 10 is increased to speed r8 from speed r7. If the ambient temperature continues to increase, the speed of the fans 10 is maintained at speed r8. However, if the ambient temperature decreases to temperature t10 due to the acceleration of the fans 10, the speed of the fans 10 is decreased to speed r7 accordingly. It is obvious that with such two-stage temperature-speed control in the power-saving operating mode, the embodiment is suitable for electronic devices with fewer loads or having stable load number.

Figure 6:
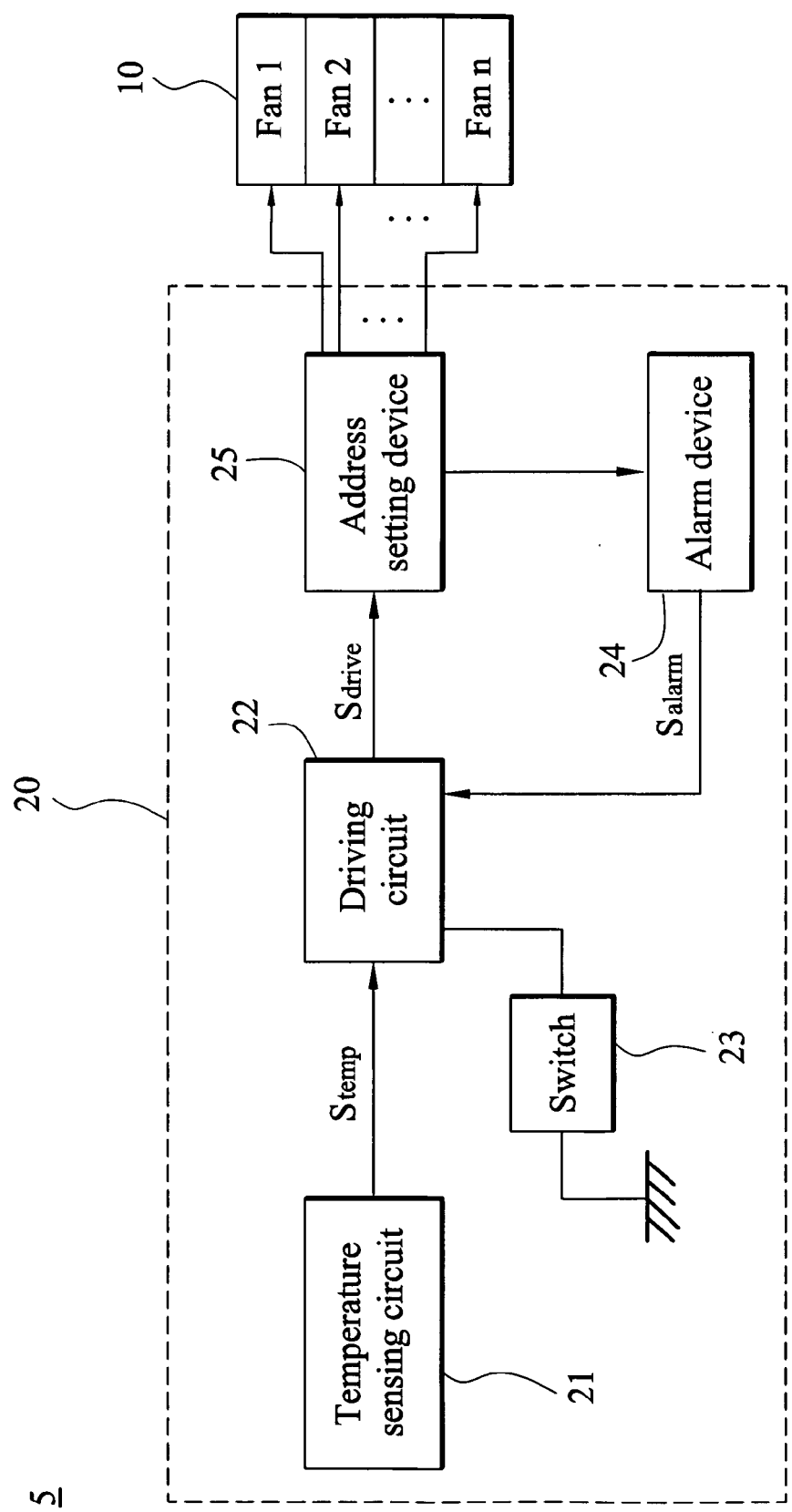
FIG. 6 is a schematic diagram of another embodiment of a fan module of the invention.

FIG. 6 shows another embodiment of the control device 20 of the invention. The control device shown in FIG. 6 further comprises an address setting device 25 coupled between the driving circuit 22 and the fans 10. The address setting device 25 sets an address for each fan 10. Moreover, the address setting device amplifies and transforms the fan driving signal $S_{drive}$ generated by the driving circuit 22 to several independent fan driving signals $S_{drive}$. Thus, the driving circuit 22 is able to retrieve the operating condition of the fans 10 via the address setting device 25 in the event of any failure in the fans 10, and then increase the speed of other fans 10 to compensate. The address setting device 25 further includes a plurality of indicators (not shown) according to the number of addresses, wherein a corresponding indicator turns on in the event of a failure of any of the fans 10. Thus, users obtain the number and position of the malfunctioned fans easily While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fan module comprising:
   a plurality of fans; and
   a control device comprising:
   a temperature sensing circuit for detecting an ambient temperature of the fans and generating a sensing signal; and
   a driving circuit coupled between the fans and the temperature sensing circuit driving the fans in a fully powered operating mode or a power-saving operating mode, wherein the driving circuit can select one of the operating modes in accordance with the sensing signal and then generate a driving signal to control the speed of the fans; and
   wherein the driving circuit comprises a driving processor having a built-in driver program with respect to the fully powered and power-saving operating modes.

2. The fan module of claim 1, wherein the fans are integrated in a frame and signal lines and power lines of the fans are connected to the control device.

3. The fan module of claim 1, wherein the temperature sensing circuit comprises a thermal sensor or a thermistor.

4. The fan module of claim 1, wherein the driving signal is a pulse width modulation (PWM) signal.

5. The fan module of claim 1, wherein the control device further comprises an alarm device coupled between the fans and driving circuit for generating a warning signal to the driving circuit when one fan is failed, thereby allowing the driving circuit to modulate the driving signal.

6. The fan module of claim 1, wherein the fan module is disposed in an electronic device in which a plurality of loads are disposed, and the driving circuit switches between the fully powered and power-saving operating modes according to the number of the loads and the heat generated thereby.

7. The fan module of claim 6, wherein the driving circuit drives the fans in the power-saving operating mode when the loads in the electronic device are stable; and the driving circuit drives the fans in the fully powered operating mode when the loads in the electronic device are unstable.

8. The fan module of claim 1, wherein the control device further comprises an address setting device coupled between the driving circuit and the fans for setting addresses for the fans and enabling the driving circuit to retrieve the operating condition of the fans therethrough.

9. The fan module of claim 8, wherein the address setting device further comprises a plurality of indicators corresponding to the fans, wherein a corresponding indicator turns on in the event of a failure in any of the fans.

10. The fan module of claim 1, wherein the control device further comprises a switch coupled to the driving circuit for controlling the driving circuit to operate in the fully powered or power-saving operating modes.

11. The fan module of claim 10, wherein the switch is a manually operated switch.

12. A control device coupled to a fan, comprising:
- a temperature sensing circuit for detecting an ambient temperature of the fan and generating a sensing signal;
- a driving circuit coupled between the fan and the temperature sensing circuit, for driving the fan in a fully powered operating mode or a power-saving operating mode, wherein the driving circuit can select one of the operating modes in accordance with the sensing signal and then generate a driving signal to control the speed of the fan; and
- a switch coupled to the driving circuit for controlling the driving circuit to operate in the fully powered or power-saving operating modes.

13. The control device of claim 12, wherein the driving circuit comprises a driving processor having a built-in driver program with respect to the fully powered and power-saving operating modes.

14. The control device of claim 12, wherein the driving circuit receives a high-level signal to operate in the fully powered operating mode when the switch is open and receives a low-level signal to operate in the power-saving operating mode when the switch is closed.

15. The control device of claim 12, further comprising an alarm device coupled between the fans and driving circuit for generating a warning signal to the driving circuit in response to fan failure, thereby allowing the driving circuit to modulate the driving signal.

16. The control device of claim 12, wherein the control device is disposed in an electronic device in which a plurality of loads are disposed, and the driving circuit switches between the fully powered and power-saving operating modes according to the number of the loads and the heat generated thereby.

17. The control device of claim 16, wherein the driving circuit drives the fans in the power-saving operating mode when the loads in the electronic device are stable; and the driving circuit drives the fan in the fully powered operating mode when the loads in the electronic device are unstable.

18. A control device coupled to a fan, comprising:
- a temperature sensing circuit for detecting an ambient temperature of the fan and generating a sensing signal;
- a driving circuit coupled between the fan and the temperature sensing circuit, for driving the fan in a fully powered operating mode or a power-saving operating mode, wherein the driving circuit can select one of the operating modes in accordance with the sensing signal and then generate a driving signal to control the speed of the fan; and
- an address setting device coupled between the driving circuit and the fan, setting addresses for the fan and enabling the driving circuit to retrieve the operating condition of each of the fan therethrough.

* * * * *